United States Patent [19]

Price et al.

[11] 4,096,131

[45] Jun. 20, 1978

[54] ONE PACK POLYSULPHIDE SEALANTS

[75] Inventors: Norman O. Price, Warley; Harold Coates, Wombourne; Christopher S. Ely, Warley, all of England

[73] Assignee: Albright & Wilson Limited, Worley, England

[21] Appl. No.: 666,908

[22] Filed: Mar. 15, 1976

[30] Foreign Application Priority Data

Mar. 21, 1975 United Kingdom ............... 11862/75
Mar. 21, 1975 United Kingdom ............... 11863/75
Mar. 21, 1975 United Kingdom ............... 11864/75

[51] Int. Cl.² ............................................. C08F 28/00
[52] U.S. Cl. .................................. 260/79; 260/18 S; 260/28 R; 260/33.2 R; 260/33.2 SB; 260/33.6 R; 260/33.6 SB; 260/37 R; 260/37 SB; 260/79.1
[58] Field of Search ................... 260/79, 79.1, 33.2 R, 260/33.2 SB, 37 R, 37 SB, 33.6 R, 33.6 SB, 28 R, 18 SB

[56] References Cited

U.S. PATENT DOCUMENTS

| 2,701,192 | 2/1955 | Maass | 51/298 |
|---|---|---|---|
| 3,872,059 | 3/1975 | Ely | 260/79 |
| 3,925,331 | 12/1975 | Ely | 260/79 |

FOREIGN PATENT DOCUMENTS

| 2,000,956 | 7/1970 | Germany. |
|---|---|---|
| 711,236 | 6/1954 | United Kingdom. |
| 1,160,104 | 7/1969 | United Kingdom. |
| 1,247,815 | 9/1971 | United Kingdom. |
| 1,248,544 | 10/1971 | United Kingdom. |

OTHER PUBLICATIONS

Hofmann, Vulcanization and Vulcanizing Agents, (1968), pp. 73, 77, 78, 98–106, 197, 207–211, 225, 226, 254 and 256.

*Primary Examiner*—Melvyn I. Marquis
*Attorney, Agent, or Firm*—Flynn & Frishauf

[57] ABSTRACT

Moisture curable extrudable polysulphide sealants comprise the reaction product of (a) a silanized polysulphide obtained by reacting an SH terminated polysulphide with a silane having 2 or 3 hydrolyzable groups and 1 or 2 groups capable of reacting with the SH group in order to cover up to 30% of the SH groups with the silane and (b) a disulphide containing the group

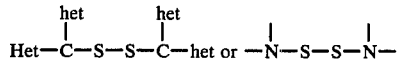

group wherein het is an O or S atom or N-organic group. Other moisture curable extrudable sealants comprise the silanized polysulphide (a) and an ortho ester e.g. triethylorthoacetate.

45 Claims, No Drawings

ONE PACK POLYSULPHIDE SEALANTS

This invention relates to one pack polysulphide sealants, which are curable with moisture.

In British Patent Applications No. 18910/71, and 55695/72 which correspond to U.S. Pat. Nos. 3,872,059 and 3,925,331, are described the production of one pack moisture curable polysulphide sealants by reaction of an SH terminal polysulphide with a silane, having one or two specified groups with which the SH groups of the polysulphide can react and at least two hydrolyzable groups, the polysulphide and silane reacting together to cover 3 – 30% of the SH groups with silicon containing groups. We have found that the reaction between silane and polysulphide becomes more difficult as the molecular weight of the polysulphide increases.

The present invention provides a sealant composition which can be extruded and can be cured with moisture to give an elastomer, said composition comprising an SH containing reaction product of (a) a silanized polysulphide which is the product of reacting under anhydrous conditions a polysulphide of formula $$HS[(CH_2(R')_bCH_2S_a)_c(R''S_a)_d(SH)_f]CH_2(R')_bCH_2SH$$

where $a$ is 1 – 5, $b$ is 0 or 1, $c$ is 5 – 50, $d$ is 0 – 0.5$c$ and $0.05c \geq f \geq d$, $1 > f$ which is $d$ times (No. of free valencies in $R'' - 2$), $R'$ is O, S or a divalent saturated organic radical consisting of CH and optionally O and/or S in COC, $CS_aC$ or OH links, $R''$ is an at least trivalent saturated radical consisting of CH and optionally O and/or S in COC, $CS_aC$ or OH links, with a silane of formula $Q_nSiX_{4-n}$ where $n$ is 1 or 2, Q is a group capable of reacting under the reaction conditions with the SH groups of the polysulphide and at least 2 groups X are hydrolysable groups and the remaining group X (if any) is alkyl or chloroalkyl, the silane having 1 or 2 groups capable of reaction with SH, and the silane reacting with 3 – 30% of the SH groups of the polysulphide, and (b) a disulphide of formula

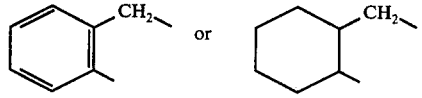

I where both $h$ are 0 or both $h$ are 1, and each of D and Y, which are the same or different, represents an —$NR_7$ group, each of E and G, which are the same or different, represents an oxygen or sulphur atom or an $NR_8$ group, and each of $R_5$, $R_6$, $R_7$ and $R_8$ which are the same or different, represents a univalent aliphatic, cycloaliphatic or heterocyclic group, an aryl group of 6 – 13 carbon atoms, or an aralkyl group of 7 – 19 carbon atoms, a cycloaliphatic aliphatic group or a heterocyclic aliphatic group, or at least one pair of $R_5$ and $R_7$, $R_6$ and $R_8$, $R_5$ and $R_8$ or $R_6$ and $R_8$ together represent a divalent aliphatic group of 2 to 8 carbon atoms, an arylene group, a cycloalkylene group, arylalkylene group, cycloalkylalkylene group or a divalent aliphatic group of 2 to 8 carbon atoms, which is interrupted by an oxygen or sulphur atom in an ether or thioether linkage respectively, or by an imino group of formula $NR_9$ where $R_9$ is hydrogen or an alkyl, aralkyl or aryl group, or, when both $h$ are 1, each of D and Y, which are the same or different, may be an oxygen or sulphur atom. The sealant composition contains unreacted SH groups and accordingly does not contain amounts of peroxides, or tin compounds or zinc compounds (or other compounds, which are capable of curing SH terminated polysulphides in the absence of moisture).

Preferably the disulphides are symmetrical with the group

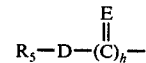

the same as the group

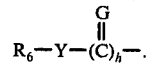

In the disulphide (b), each of $R_5$ and $R_6$, $R_7$ and $R_8$ which are the same or different, preferably represents an alkyl group, e.g. of 1 to 8 carbon atoms, a cycloalkyl group, e.g. of 5 or 6 carbon atoms, or an aryl group of 6 to 13 carbon atoms, e.g. an aromatic hydrocarbon of 6 to 8 carbon atoms, such as a phenyl or tolyl group, or an aralkyl group of 7 to 19 carbon atoms, e.g. an aralkyl hydrocarbon group, such as benzyl, or at least one pair of $R_5$ and $R_7$, $R_6$ and $R_8$, $R_5$ and $R_8$ or $R_6$ and $R_8$ represents an alkylene group of 2 to 8 carbon atoms, to form a ring of 4 – 8 ring members preferably 5 or 6 ring members, an arylene group of e.g. 6 to 12 carbon atoms, such as a phenylene group, especially with the free valencies on adjacent carbon atoms, e.g. o- phenylene, a cycloalkylene group, e.g. of 5 to 6 carbon atoms, or an arylalkylene group, or cycloalkylenealkylene group, e.g. of 7 to 13 carbon atoms, such as one of formula

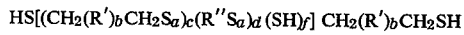

Some preferred disulphides are of formula

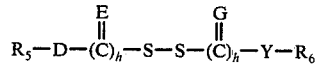

wherein both $h$ are 1 and each of D, E, G and Y, which are the same or different, represents an oxygen or sulphur atom, or an $NR_7$ group, and each of $R_5$, $R_6$ and $R_7$, which are the same or different, represents a monovalent alkyl group, a cycloalkyl group, an aryl group of 6 – 13 carbon atoms or an aralkyl group of 7 – 19 carbon atoms, or at least one pair of $R_5$ and $R_7$, or $R_6$ and $R_7$ represents an alkylene or alkenylene group of 2 to 8 carbon atoms, an arylene group, a cycloalkylene group, arylalkylene group or a cycloalkylenealkylene group.

In particular preferred compounds (II) in which both $h$ are 1, E and G are both sulphur atoms and D and Y are both sulphur, or especially both oxygen atoms. Such compounds are xanthogen disulphides (D and Y are oxygen) or dithio carbonates (D and Y are sulphur). In such compounds II, $R_5$ and $R_6$ are preferably alkyl groups of 1 to 8 carbon atoms such as methyl, ethyl, propyl, butyl or octyl groups. Examples of these compounds are ethyl xanthogen disulphide and butyl xanthogen disulphide.

Other particularly preferred compounds III in which both $h$ are 1, have the formula

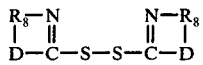

where D is an oxygen or sulphur atom or $NR_9$ group, $R_8$ is as defined above for a pair of $R_5$ and $R_7$, or $R_6$ and $R_7$, and $R_9$ is hydrogen or an alkyl group of 1 to 8 carbon atoms, e.g. methyl or ethyl. Preferably $R_8$ is an ethylene or 1,3-propylene group, which with D as an NH group makes the compound the disulphide from ethylene or propylene thiourea, or $R_8$ is an o-phenylene group, optionally with at least one substituent such as a halogen atom, e.g. a chlorine or bromine atom or an alkyl group of 1 to 6 carbon atoms, e.g. a methyl group, which gives benzoxazole, benzthiazole or benzimidazole disulphides.

Further preferred compounds in which both $h$ are 1, are thiuram disulphides of formula

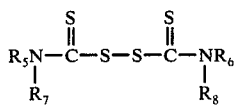

wherein each of $R_5$, $R_6$, $R_7$ and $R_8$, which are the same or different, represents an alkyl group of 1 to 8 carbon atoms, e.g. a methyl, ethyl, propyl, butyl or octyl group but especially an alkyl group of 1 to 4 carbon atoms, a cycloalkyl group of 5 or 6 carbon atoms, e.g. a cyclohexyl group, or an aryl group, e.g. an aromatic hydrocarbon group of 6 to 12 carbon atoms especially 6 to 8 carbon atoms, such as a phenyl or tolyl group, or at least one of the pairs $R_5$ and $R_7$, or $R_6$ and $R_8$ together form an alkylene group of 3 to 7 carbon atoms, such as a pentamethylene group. The aryl group for $R_5 - R_8$ may contain one or more non hydrocarbon substituents, e.g. a halogen atom such as a chlorine or bromine atom. Preferably the groups $R_5 - R_8$ are such that the bases $R_5R_7NH$ and $R_6R_8NH$ are weak bases of $pK_a$ not greater than 9. Thus especially preferred compounds V are those in which $R_5$ and $R_6$ are aryl groups and $R_7$ and $R_8$ are as defined above and especially alkyl groups of 1 to 8 carbon atoms, e.g. methyl or ethyl groups. Examples of compounds IV are tetramethyl- and tetrabutyl-thiuram disulphide and dicyclopentamethylene thiuram disulphide, and examples of a compound V are di (N-phenyl N-methyl) thiuram disulphide (methylaniline thiuram disulphide, and di (N-phenyl-N-ethyl) thiuram disulphide.

Other preferred compounds VI in which both $h$ are 0, are of formula

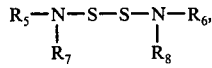

and are dithioamines. In these compounds each of $R_5$, $R_6$, $R_7$ and $R_8$, which are the same or different represents an aliphatic, cycloaliphatic, heterocyclic or aralkyl group or a cycloaliphatic - aliphatic or heterocyclicaliphatic group, or at least one pair of $R_5$ and $R_7$, or $R_6$ and $R_8$ combined represents a divalent aliphatic group which may be interrupted by an oxygen or sulphur atom in an ether or thioether linkage respectively or by an imino group of formula $NR_9$, wherein $R_9$ is hydrogen or an alkyl or aryl group. Each of $R_5$, $R_6$, $R_7$ and $R_8$ may be an alkyl group, e.g. of 1 – 12 carbon atoms, preferably of 1 – 8 carbon atoms such as methyl, ethyl, isopropyl, butyl or octyl, or an alkyl group, e.g. of 1 to 6 carbon atoms, which is substituted by a cyano group preferably in a terminal position, e.g. a cyanomethyl or $\beta$ - cyanoethyl group; preferably $R_5$ and $R_6$ are alkyl groups or cycloalkyl groups of 5 – 7 carbon atoms and $R_7$ and $R_8$ are alkyl groups or cyanoalkyl groups. Each of $R_5$, $R_6$, $R_7$ and $R_8$ may also be a cycloaliphatic group, usually of 5 – 7 carbon atoms such as a cyclohexyl group. The heterocyclic group, which may be represented by $R_{5-8}$, is usually saturated such as an oxolan or thiolan group. Examples of the cycloaliphatic - aliphatic group are cyclohexyl-alkylene groups such as a cyclohexylmethyl group. Examples of the aralkyl group are hydrocarbyl groups of 7 – 19 carbon atoms such as a benzyl or $\beta$ - phenyl ethyl group. Examples of the heterocyclic - aliphatic group are the tetrahydrofurfuryl group and its sulphur analogue. When $R_5$ and $R_7$, and/or $R_6$ and $R_8$ are combined in a divalent radical, this radical is usually an alkylene group of 2 – 8 carbon atoms, which, when of 3 or 4 carbon atoms, may be interrupted by an oxygen atom in an ether linkage (as in the 3-oxapentamethylene group), a sulphur atom in a thio ether linkage or by an imino group of formula $-NR_9-$ wherein $R_9$ is hydrogen or an alkyl, aralkyl or aryl group, such as a methyl, ethyl, benzyl or phenyl group. Preferably the $R_5NR_7$ and $R_6NR_8$ groups form 5 or 6 membered heterocyclic rings. Examples of the cyclic ring groups are morpholino, thiamorpholino, piperidino, $\alpha$- pipecolino or piperazino groups. Preferably $R_5$ is the same as $R_6$, and $R_7$ is the same as $R_8$. Particular examples of the dithio amine are: N,N'- dithio bis (dialkyl amines), e.g. the bis diethyl amine, dioctyl amine and diisopropylamine: N,N'- dithio bis (alkyl-cyanoalkyl amines), e.g. the bis $\beta$-isopropylamine propionitrile, the bis $\beta$-n butylamine propionitrile, the bis ethylaminopropionitrile and their acetonitrile analogues; N,N'- dithio bis (cyclohexyl-cyanoalkylamines), e.g. the bis cyclohexylaminoacetonitrile and the bis $\beta$-cyclohexylaminopropionitrile; N,N'- dithio bis - (N-alkyl or cycloalkyl - tetra hydrofurfurylamines), e.g. the bis N-n butyl-tetrahydrofurfurylamine and the bis - N -cyclohexylfurfurylamine; and N,N'-dithio bis morpholine which is most preferred.

The silanized polysulphide and the disulphide of formula 1 are reacted together to produce longer chain silanized polysulphides which can only with more difficulty be prepared by previous processes. The reaction conditions needed are capable of wide variation. Thus the temperature and time, which are inversely related, may vary from 15° to 150° C for 5 minutes to 5 days, usually 70° – 140° C for 30 minutes to 12 hours, and preferably 100° – 120° C for 1 to 4 hours. Refluxing a solution of the reactants in toluene for about 2 hours is often preferred, but reaction times of 1 – 24 hours at 20° – 50° C may be all that is needed for reactive thiuram disulphides of formula IV in which $R_5 - R_8$ are alkyl groups. The reaction may be carried out in the absence of a diluent but is preferably carried out in an inert liquid diluent, e.g. an aromatic hydrocarbon such as benzene, toluene or xylene, or cyclohexane or a paraffin. Conveniently the reaction is carried out in refluxing toluene. Preferably the reaction is performed under an atmosphere of inert gas, e.g. nitrogen.

The compositions of the invention can be formulated as sealants and extruded to give a product which can be cured with moisture to give an elastomer. The features of the composition which govern whether it can be extruded, whether it can be cured to give an elastomer and the degree of extensibility of the elastomer and the shelf life of the composition depend on (a) the molecular weight of the polysulphide before reaction with the silane, (b) the proportion of tri, tetra or higher functional SH containing groups in the polysulphide (c) the degree of reaction of the polysulphide and the silane, (d) the nature of the disulphide of formula I, (e) the amount of disulphide of formula I and (f) the nature and amount of any moisture inhibitor present in the sealant composition. The influence of each of these features is as follows.

The higher the molecular weight of the polysulphide before silanization when all the other features are constant (i.e. the higher the value of $c$ in the polysulphide formula), the higher the molecular weight of the reaction product and hence the greater the likelihood of producing on curing an elastomer and the higher the extendibility thereof, until the limit is reached at which the reaction product of silanized polysulphide and disulphide is a solid not a fluid; it may be possible to plasticize a low molecular weight solid in order to be able to extrude it but it is preferable that the reaction product is a fluid, e.g. has a molecular weight of not more than 15,000 preferably 4000 – 15,000, such as 7000 – 13,000 and especially 8000 – 13,000; these molecular weights are especially suitable for reaction products from polysulphides of formula IX and X given below.

The higher the proportion of tri and higher SH containing functional groups in the polysulphide (i.e. the higher the value of $d$), when the other features are kept constant the higher the degree of cross linking in the cured product and the lower the extensibility i.e. gives a progressively harder and less extensible cured product. Values of $d$ of up to $0.05c$ are generally suitable.

The higher the degree of reaction of the silane and polysulphide when all the other features are constant, the greater the degree of cross linking in the cured product and hence in the case of very low molecular weight polysulphides the greater the chance of the cured product being an elastomer and, in the case of very high molecular weight polysulphides the greater the chance of the cured product being an inextendible solid. In general, and especially for the polysulphides of formula IX and X hereafter, the ratio of the molecular weight of the polysulphide to the percentage of SH groups reacted with silane is preferably 140 – 300: 1 e.g. 145 – 200:1 such as 150 – 183:1 and especially 153 – 165: 1.

The influence of the nature and amount of the disulphide of formula I can be considered together. The higher the amount of disulphide the higher the molecular weight of the reaction product and hence in the case of very low molecular weight polysulphide the greater the chance of the cured product being an elastomer and in the case of the higher molecular weight polysulphide the greater the chance of the reaction product being a solid not a fluid. Generally the multiplication product of the molar fraction of disulphide to polysulphide and the molecular weight of the polysulphide is in the range 200 – 3500, preferably 200 – 2000. For disulphides of formula II, and IV – VI, the multiplication product is preferably 400 – 2000 especially 600 – 2000, in particular for the polysulphides of formula IX and X below.

Thus for an about 4000 molecular weight polysulphide such as that of formula X below the molar porportion of these disulphides to polysulphide is usually 0.1 : 1 to 0.5 : 1. For disulphides of formula IV, and VI, the above multiplication product is especially 400 – 1200, e.g. 600 – 1100, corresponding for the 4000 molecular weight polysulphide to a range of molar proportions of 0.1 – 0.3 : 1 e.g. 0.15 – 0.28 : 1 especially ca 0.2 : 1. For disulphides of formula II, the above multiplication product is preferably 1000 – 2000, e.g. 1000 – 1500, corresponding for the 4000 molecular weight polysulphide to a range of molar proportions of 0.25 – 0.5 : 1, e.g. 0.25 – 0.37 : 1 and especially 0.33 : 1. For disulphides of formula III, the above multiplication product generally lies in the range 200 – 700, especially 200 – 500, so for the 4000 molecula weight polysulphide a range of molar porportions of 0.05 : 1 to 0.18 : 1, e.g. 0.05 – 0.12 : 1 especially 0.09 : 1 is suitable. For formula V disulphides, the above product is preferably 800–1400 eg 1000–1200; for the 4000 MW polysulphide, a molar proportion of 0.2–0.35 : 1 eg 0.27 : 1 is used.

The influence of any moisture inhibitor on the nature of the cured product is described later.

In general in order to make a sealant composition which gives a cured product of high extensibility it is desirable to choose a combination of molecular weight of the polysulphide, degree of reaction of the silane, and molar fraction of disulphide to polysulphide in which the higher the polysulphide molecular weight and degree of reaction, the lower is the molar fraction; conversely the lower the polysulphide molecular weight and degree of reaction the higher the molar proportion. Combinations in which the ratio of polysulphide molecular weight to degree of reaction, and the multiplication product of the molar fraction and polysulphide molecular weight are as given above are particularly important, especially for the polysulphides of formula IX and X below.

The degree of reaction of silane and polysulphide, the conditions for reaction of polysulphide and disulphide and the proportion of any particular disulphide to any particular polysulphide required can be determined by simple experiment within the broad general outlines described above. The disulphid and silanized polysulphide are reacted together and the reaction monitored by thin layer chromatography to disappearance of the disulphide. The product can be formulated as described hereinafter, moisture cured and tested for elongation. The optimum choice depends to some extent on the use of the sealant as this governs the extensibility required. Building sealants for use in climates without high temperature changes can have a lower extensibility than is suitable for sealants for use in climates with high temperature changes.

The silanized polysulphide HSZSH is believed to react with the disulphide of formula I in which $h$ is one according to the following reaction scheme.

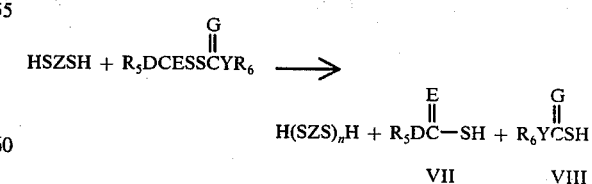

When each pair of D and E, and Y and G are not combined in a ring, the byproduct compounds VII and VIII have a tendency to decompose with production of ECS and GCS and $R_5DH$ or $R_6DH$. Thus, when E or G is sulphur, carbon disulphide is produced. Examples of the $R_5DH$ and $R_6YH$ compounds are alcohols, thiols and amines. When the compound $R_5DH$ is an amine, then the silanized polysulphide also reacts under the basic conditions to give higher molecular weight products, which if the amine is a strong enough base may be solids and hence usable with difficulty if at all in sealant formulations. Accordingly, it is preferred that if the disulphides of formula I have $R_5D$ and $R_6Y$ groups such that $R_5DH$ and $R_6YG$ are amines of $pK_a$ greater than 9, i.e. strong bases, the formulastion of the invention should be used within 1 to 2 months of their production. However, to reduce the increase in the molecular weight, and therefore to increase the shelf life of the formulations, the compounds of formula I in which $h$ is 1 preferably have $R_5D$ and $R_6Y$ groups such that $R_5DH$ and $R_6YH$ are compounds of $pK_a$ less than 9, e.g. aromatic amines, thiols and alcohols. Examples of such preferred compounds of formula I are of formula V and II.

IN the case of disulphides of formula I in which $h$ is 1 and D and E are combined together as are G and Y, e.g. the compounds of formula III and the disulphides in which $h$ is 0 e.g. those of formula VI, the compounds of formula $R_5DCESH$ and $R_6YCGSH$, $R_5R_7NSH$ and $R_6R_8NSH$ do not tend to decompose, so the above byproduct complications are believed not to occur.

It is believed that it is the competitive nature of the reactions of the silanized polysulphide with the carbon disulphide, disulphide of formula I and strong base amines which makes the necessary amounts of the disulphide for reaction with the polysulphide different for even closely related disulphides.

The decomposition to form carbon disulphide or carbon oxysulphide may be inhibited if the reaction mixture contains a carbonate or bicarbonate, e.g. of an alkali or alkaline earth metal, such as sodium, potassium or calcium.

The silanized polysulphide is obtained by reacting under anhydrous conditions a polysulphide of the statistical formula HS [(CH$_2$(R')$_b$CH$_2$S$_a$)$_c$(—R" S$_a$)(SH)$_f$] CH$_2$(R')$_b$CH$_2$SH where $a$ is 1 - 5, preferably 1 - 3 and especially 2 - 3 and need not necessarily be an integer.
$b$ is 0 or 1
$c$ is 5 - 50, preferably 5 - 30
$d$ is 0 up to 0.05c, preferably 0.001c - 0.05c.
$f$ is subject to the conditions $0.05c \geq f \geq d$, $1 \geq f$ and
$f = d \times$ (No. of free valencies in R" — 2).
R' is —O—, S— or an organic divalent radical free of aliphatic unsaturation consisting of C and H and optionally O and/or S$_a$ in the form of —C—O—C—, —OH or —C—S$_a$—C— links, R" is an organic radical free of aliphatic unsaturation and having at least 3 free valencies and consisting of C and H and optionally O and/or S$_a$ in the form —C—O—C, —OH or —C—S$_a$—C— links, and the free valancies being for carrying all the $f$ SH groups and the CH$_2$R'$_b$CH$_2$S$_a$ and R"S$_a$ groups being in any order, with a silane of the formula Q$_n$SiX$_{(4-n)}$ were $n$ is 1 or 2, Q is a reactive group capable of reacting with SH groups of the polysulphide preferably an organic group having an epoxide, episulphide or mercapto group, (preferably in a terminal position), CH$_2$=CR$_1$ COOC$_{m+1}$H$_{2m+2}$— or CH$_2$= CR$_2$—C$_m$H$_{2m}$- group, where $m$ is 0, 1, 2 or 3, each of R$_1$ and R$_2$ which are the same or different, is hydrogen or is an alkyl radical of 1 to 4 carbon atoms, preferably methyl, (with R$_1$ preferably methyl, and R$_2$ preferably hydrogen) and at least two X's are organic hydrolyzable groups and the remaining group X (if any) is an alkyl group of 1 to 6 carbon atoms, preferably methyl, or a chloro alkyl radical of 1 to 6 carbon atoms, the silane having a total of only 1 or 2 groups, which react with SH in the polysulphide under the reaction conditions, the reaction being carried out at a temperature and for a time, and using a quantity of silane such that for the silane in question the proportion of the SH groups of the polysulphide which react with the silane is from 3 - 30%.

In the polysulphide, the $c$ and $d$ repeating units are joined in any order with the polymer having linear and branched chains, the $f$ SH groups being attached to free valencies in the combined $c/d$ units whether those valencies are on the $c$ or $d$ units.

Preferably R' is the organic divalent radical, especially one with a linear chain. It preferably has less than 8 carbon atoms, 0 - 4 oxygen atoms and 0 - 4 S$_a$ groups and is usually aliphatic; the oxygen and/or sulphur atoms are preferably present in C—O—C or C—S$_a$—C groups. Examples of R' are —CH$_2$OCH$_2$, —CH$_2$CH$_2$OCH$_2$—, —CH$_2$S CH$_2$SCH$_2$—, —CH$_2$S CH$_2$—, —(CH$_2$)$_3$O CH$_2$O (CH$_2$)$_3$— and most preferred —CH$_2$O CH$_2$O CH$_2$—.

Preferably R" has less than 10 carbon atoms and 0 - 4 oxygen and O—S$_a$ groups and is usually aliphatic. R" usually has two terminal CH$_2$— groups.

Examples of suitable groups for R" are

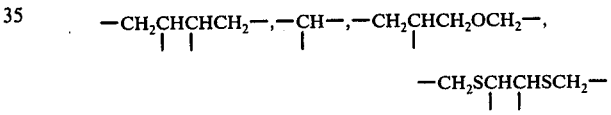

but most especially —CH$_2$—CH—CH$_2$—. R" is usually trivalent but may be tetravalent. The preferred range for $d$ is 0.001c - 0.005c. Preferred absolute values for $f$ are 0.001 - 0.2, ie. a total of 2.001 - 2.2 SH groups per molecule. Typical polysulphides for use in sealant compositions according to the invention will contain

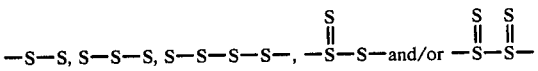

linkages. Compounds which are particularly of use are those having —S—S— or both S—S and —S— linkages, in particular those containing a multiplicity of (CH$_2$CH$_2$O CH$_2$O CH$_2$CH$_2$S$_2$) groups. Preferred polysulphides are those of formula

Compounds of this formula are described in U.S. Patent 2466963 and some are commercially available, examples available from Thiokol Chemical Corporation of Trenton, N.J. being designated LP31, LP2, LP32, LP33, LP12 and LP3. The characteristics of these polymers are as follows.

| Designation | c | d | Wt. cross link (i.e. $\frac{100d}{c+1}$) % | Approximate Molec. Wt. |
|---|---|---|---|---|
| LP 31 | 40–46 | 0.2–0.23 | 0.5 | 7500 |
| LP 2 | 23 | 0.48 | 2 | 4000 |
| LP 32 | 23 | 0.12 | 0.5 | 4000 |
| LP 12 | 23 | 0.024 | 0.1 | 4000 |
| LP 3 | 5 | 0.12 | 2 | 1000 |
| LP 33 | 5 | 0.03 | 0.5 | 1000 |

Polysulphides of the above formula can also be prepared as described by Eugene R. Bertozzi in Rubber Chem. Tech. 41, (1) 114–150, 1968. The preferred silanes are those with vinyl groups for Q and are exemplified by vinyl tri alkoxy silanes and vinyl alkyl di(alkoxy) silanes where each alkyl and alkoxy group has 1 – 6 carbon atoms, eg. vinyltriethoxy silane, vinyl trimethoxy silane, vinyl methyl diethoxy silane, vinyl methyl dimethoxy silane and vinyl hexyl diethoxy silane. Preferred silanes with vinylic ester groups are 3 - (trialkoxy silyl) propyl methacrylates and 3 - (alkyl di (alkoxy) silyl) propyl methacrylates, with 1 to 6 carbon atoms in each alkyl and alkoxy group, especially 1 or 2 carbon atoms, eg. the propyl methacrylates with as substituent in the 3 position of the propyl group trimethoxy silyl, triethoxy silyl, methyldimethoxy silyl groups. Preferred silanes containing an epoxide or episulphide group are of formula $Q_nSiX_{4-n}$, where $n$ and X are as defined above and Q is of formula

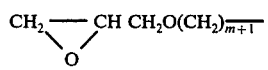

(and its episulphide analogue), or epoxycyclohexyl alkylene of 1 to 4 carbon atoms in the alkylene group, e.g. 3,4-epoxy cyclo hexylethyl. Examples of silanes containing epoxy groups are 3 - glycidoxy - 1 - (trialkoxysilyl) propanes and 3,4- epoxycyclohexyl-ethyl-trialkoxy silanes in which the alkoxy groups have 1 to 6 carbon atoms, e.g. the tri methoxy and triethoxy compounds. A mixture of silanes can be used if desired. Preferred silanes containing a mercapto group have Q of formula $HS(CH_2)_{m\mp1}$ and especially $HS(CH_2)_3-$.

Preferably in the silane $n$ is 1 and there are 2 or 3 hydrolyzable groups. The hydrolyzable groups are preferably free of groups capable of reacting under the reaction conditions with -SH, e.g. ethylene, acetylene, epoxide, ketone or aldehyde groups. Such reactive groups may be present in X so long as they react with SH under the reaction conditions for the particular silane to an extent of less than 10% of that of the group Q in that silane. The hydrolyzable groups are preferably alkoxy groups of each of 1 to 6 carbon atoms, or alkanoyl groups of 2 to 6 carbon atoms e.g. acetoxy or propionoxy groups, or hydrocarbyl isocyanoxy groups which are derived from ketones, e.g. 3 to 10 carbon atoms, such as acetoxime and cyclohexanonoxime. When $n$ is 1 and there are only 2 hydrolyzable groups for X, the remaining X group is preferably a methyl group.

When the polysulphide has a molecular weight of less than 2000, the silane usually reacts with 3 – 7% of the SH groups in the polymer. When the polysulphide has a molecular weight of 2000 – 8000, the silane usually reacts with 7 – 30%, of the SH groups. The amount of the silane which has in fact reacted with the polysulphide polymer may be determined by the method described by B. Saville in Analyst 86, (1961)p. 86, modified to keep the polymer in dispersion. The conditions of reaction including times, temperatures, amounts of silane and catalysts are as described in our aforesaid Patent Applications, the disclosure of which is incorporated herein by reference. Sulphur is a particularly useful catalyst.

Particularly preferred silanized polysulphides are those which are obtained by reacting by reacting under anhydrous conditions a polysulphide of formula HS [CH$_2$CH$_2$OCH$_2$OCH$_2$CH$_2$S$_a$)$_c$(CH$_2$CHCH$_2$S$_a$)$_d$(SH)$_f$] CH$_2$CH$_2$OCH$_2$OCH$_2$CH$_2$SH  IX
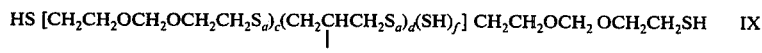

wherein $a$ is 2 – 3 and $d$ and $f$ are the same and up to $0.05c$ and $c$ is 5 – 50 with an amount of silane of formula Q SiX$_3$, wherein Q is a vinyl group and two X groups represent methoxy or ethoxy groups and the third X group represents a methyl, methoxy or ethoxy group, sufficient to react with 3 – 30% of the SH groups of the polysulphide, the ratio of the molecular weight of the polysulphide to the % of the SH groups reacted with silane being 140 : 1 to 300 : 1. Especially in combination with these preferred polysulphides the product of the molar fraction of disulphide to polysulphide and the molecular weight of the polysulphide is 200 – 2000, with the more preferred amounts for the various types of disulphide being as given above.

Examples of especially preferred combinations of silanized polysulphides and disulphides of formula I are those in which the silanized polysulphide is derived by reaction of a polysulphide of formula HS [(CH$_2$CH$_2$OCH$_2$OCH$_2$CH$_2$S$_2$)$_c$ (CH$_2$CHCH$_2$S$_2$)$_d$ (SH)$_d$] CH$_2$CH$_2$OCH$_2$OCH$_2$CH$_2$SH  X
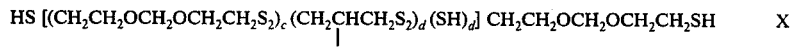

where $c$ is 23, and $d$ is up to 1 eg .02 – 05, with vinyl methyl dimethoxy silane or vinyl triethoxy silane to cover 20 – 27% (especially 22 – 26%) of the SH groups, and is reacted with one of the following: (a) 0.5 – 2.5% e.g. 0.5 – 1.5% preferably 0.5 – 1% and especially 0.75% by weight of dibenzthiazole disulphide, (b) 0.5 – 4% e.g. 1 – 3%, preferably 1.3 – 2.1% e.g. 1.5 – 2% and especially 1.75% by weight of diethyl xanthogendisulphide

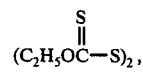

(c) 0.5 – 3%, preferably 1.5 – 3% e.g. 2 – 3, especially 2.25% by weight of bis (methylaniline) thiuram disulphide, (d) 0.5 – 5%, preferably 0.8 – 3% e.g. 1–2% especially 1 – 1.5% usually 1.25% by weight of tetramethyl thiuram disulphide, (e) 2 – 6%, preferably 2.5 – 5% and especially 2.5 – 4% such as 2.5 – 3.5% e.g. 3% by weight of tetrabutyl thiuram disulphide or 0.5 – 2.5%, preferably 0.8 – 2% e.g. 1 – 1.5% by weight of N,N'- dithio bis morpholine. Before reaction with the disulphide the silanized polysulphide has an SH content by analysis of 1.20 – 1.32, preferably 1.23 – 1.29.

The silanized polysulphide and the disulphide can be formulated as such into a sealant composition, the reaction occurring in the package, or preferably are reacted together first without or especially with heating, e.g. as described above.

The present invention also provides a sealant formulation contained in a water impermeable pack, which composition comprises the moisture curable composition of the invention, and a solid filler and optionally at least one of a plasticiser and a curing catalyst. Often it also desirably contains an inhibitor and possibly pigments and/or thixotropic agents. The nature and amounts of these additives are as described in our aforesaid Patent Applications. Particularly important are diorganooxytitanium alcoholate curing catalysts especially di(isopropyloxy)titaniumdiacetylacetonate.

Formulations according to the invention normally contain from 10 – 60% e.g. 20 – 45%, preferably 25 – 45% and especially 25 – 35% by weight of the silanized polysulphide.

Although if the materials are very thoroughly dried before packaging and the packages themselves are moisture free, or if desiccant type fillers such as barium or calcium oxides are employed, it may be possible to produce effective formulations which do not contain hydrolysis inhibitor, the use of such a material is normally desirable for increasing storage stability.

Suitable inhibitors are silicon compounds capable of reacting with moisture more readily than the silicon containing moieties attached to the polysulphide chain and are described in our aforesaid Patent Applications and Patents.

Generally the silane inhibitor has the formula $Z_n'$ Si $(OZ')_{4-n'}$ where $n'$ is 0, 1 or 2, Z is hydrogen or alkyl, e.g. of 1 to 6 carbon atoms, preferably 1 or 2 carbon atoms, or aryl, e.g. aromatic hydrocarbyl of 6 – 19 carbon atoms such as phenyl, naphthyl or tolyl, and $Z'$ is as defined for Z especially methyl or ethyl or is acyl of 1 to 8 carbon atoms, e.g. formyl or alkanoyl of 2 to 4 carbon atoms, such as acetyl.

Examples of the silane inhibitor are methyltrimethoxysilane, ethyltrimethoxysilane, methyltriacetoxysilane, ethyltriethoxysilane, methyltriethoxysilane, ethyltriacetoxysilane and dimethyldiacetoxysilane.

Normally the inhibitor is present in an amount of from up to 10% by weight, such as 0.1 – 10%, preferably 0.5 – 5% and 0.5 – 3%, especially 1 – 3% by weight based on the weight of polysulphide.

We have also found that an ortho ester may be used as an alternative to the silicon containing inhibitor and the ortho ester may increase the extendibility of the moisture cured product, while at the same time inhibiting "in-package" curing. These ortho esters have the formula $(R_3)_g C(OR_4)_{4-g}$ wherein $g$ is 0 or 1, $R_3$ is hydrogen, alkyl, e.g. of 1 to 6 carbon atoms, and preferably methyl, ethyl or butyl or aryl, e.g. aromatic hydrocarbyl of 6 – 19 carbon atoms such as phenyl, naphthyl or tolyl, $R_4$ is as defined for $R_3$ apart from hydrogen.

The ortho ester may be present in the sealant composition comprising the reaction product of the silanized polysulphide and disulphide and this constitutes our aspect of the invention. The ortho ester may also be present in sealant compositions comprising the silanized polysulphide without reaction with the disulphide. Accordingly, in another aspect of the invention there is provided a sealant composition which can be extruded and can be cured with moisture to give an elastomer, which comprises (a) a silanized polysulphide which is the product of reacting under anhydrous conditions a polysulphide of formula $HS[(CH_2(R')_bCH_2S_a)_c(R''S_a)_d(SH)_f]CH_2(R')_bCH_2SH$ where $a, b, d, f, R'$ and $R''$ are as defined above and $c$ is 1 – 200, e.g. 5 – 85 such as 5 – 50 or 20 – 85 preferably 20 – 50 with a silane of formula $Q_nSiX_{4-n}$ where Q, X and $n$ are as defined above, the silane having 1 or 2 groups capable of reaction with SH, and the silane reacting with 3 – 30% e.g. 5 – 25% of the SH groups of the polysulphide, and (b) an ortho ester. The sealant composition contains unreacted SH groups and is in the absence of amounts of peroxide, tin compounds or zinc compounds (or other compounds) capable of curing the polysulphide to an elastomer or solid in the absence of moisture.

These new additives are ortho esters from carboxylic acids or ortho carbonates, depending on whether $g$ is 1 or 0 respectively. Examples of the ortho esters are triethyl orthoformate, orthoacetate, orthopropionate, orthovalerate and orthobenzoate and their trimethyl analogues. Examples of the ortho carbonates are tetraethyl ortho carbonate and its tetramethyl analogue.

These new additives are usually present in an amount of 0.1 – 10%, preferably 0.3 – 3%, by weight based on the weight of polysulphide.

The method of making the formulations and the water impermeable enclosures therefore are as described in our aforesaid Patent Applications.

The cured products obtained can be used as sealants, e.g. as building sealants and these cured products constitute a further feature of the invention. They usually have an extensibility by 50 – 200%, preferably 70 – 150% and especially 100 – 150%, though 50 – 120% and especially 70 – 120% may be suitable for some uses. The extensibility is measured, during elongation at 6mm/min of a sample 50 × 12 × 12mm, which has been cured by exposure to moisture for 7 days at 20° C and 50% RH. The conditions of curing and testing are basically those described in BS4254, or Fed. Spec. TT-S-00230C. The cured products also have usually a recovery after 5 minutes extension by 50 – 200% of at least 75%, often at least 90% measured one hour after release of the extending force.

The invention is illustrated in the following Examples. The "gunnability" of a composition referred to therein is a measure of the fluidity of the mixture which is made by "gunning" material from a standard caulking gun through a standard nozzle for a fixed time under a fixed gas pressure. The conditions we use are as follows: nozzle 2 × ⅛ inch diameter at 50 psi for one minute, several measurements are made and an average value is recorded. This process may be repeated over several months as a measure of storage stability.

In the Examples the following trade names are used, Calofort S, Cereclor 56L; Calofort S is the trade name of J. & E. Sturge Limited for calcium carbonate, particle size 0.1μ, coated with 3% stearic acid. Cereclor 56L is a trade name of ICI for chlorinated liquid paraffins.

The titanium dioxide used in the Examples was Runa RP grade of Laporte Industries.

Polymer Preparation

EXAMPLE A

A solution of 500 g of

sold as Thiokol LP12 in toluene (500g) was azeotropically distilled to remove water (0.4 ml) for 4 hours. To this solution was added sulphur 5 g (1% by weight based on weight of polymer) and vinylmethyldimethoxysilane 15g (3% by weight based on weight of polymer). The mixture was boiled under reflux for 15 hours. Analysis of the product showed that it contained 1.26% SH, i.e. 23.9% reaction.

EXAMPLE B

A solution of 500 g of

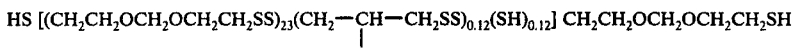

sold as Thiokol LP-32, in toluene (500 g) was azeotropically distilled to remove water (0.5 mls) for 5 hours. To the solution was added sulphur 5g (1% on polymer) and vinylmethyldimethoxysilane 15g (3% on polymer). The mixture was boiled under reflux for 16 hrs. Analysis showed that the product contained 1.24% SH i.e. 25% reaction.

Filler Combinations

| C. | Calofort S | 17.5 g. |
|----|------------|---------|
|    | $TiO_x$    | 4.0 g.  |
|    | Cereclor 56L | 14.0 g. |
| D. | Calofort S | 350 g.  |
|    | $TiO_x$    | 80 g.   |
|    | Cereclor 56L | 350 g. |

EXAMPLE 1.

Toluene was stripped from 75 g. of the product from Ex. A in vacuo at 100° C and 14 mm. A portion (25 g.) was compounded with the filler combination C, together with 0.50 g. of tetramethyl thiuram disulphide (2% by weight based on the weight of polymer) and 0.50 g. of diisopropyltitanium diacetyl acetonate DIPT-DAA. The ingredients were intimately mixed on a 3 roll mill, and then gunned into test pieces 50 × 12 × 12 mm and allowed to cure for 7 days at 50% RH and ambient temperature ca. 20° C. The samples were then extended at 6 mm/min. Cohesive failure occurred at 90% elongation. At 75% elongation a force of 14 lbs. was required, and the samples showed instantaneous recovery of 90%.

EXAMPLE 2

Example 1 was repeated but with 0.25 g. of tetramethylthiuram disulphide (1% on polymer). The blocks were cured and tested as before. At 100% elongation they were intact, requiring a force of 6½ lbs. They were held at 100% elongation for 5 mins., then released. Instantaneous recovery was 50%, and this increased to 75% in 15 mins.

EXAMPLE 3

Example 1 was repeated but with 1.25 g. (5%) of tetrabutyl thiuram disulphide (TBTDS) in place of the tetramethyl thiuram disulphide. These samples needed a force of 4 lbs. at 100% elongation and recovered by 83% after 15 mins. The samples were then placed in an oven at 50° C for 7 days and retested. A force of 30 lbs. was required at 100%, with an instantaneous recovery of 88%. Samples failed at 150% elongation with a force of 34 lbs.

EXAMPLE 4

Example 3 was repeated but with 1.50 g. (6%) of TBTDS was used. After 7 days 10 1/4 lbs. was needed at 100% and 14 3/4 lbs. at 200% elongation. Instantaneous relaxation was 75%. After further 7 days at 50° C, 39 lbs. was required at 100%, and cohesive failure occurred at 150% elongation.

EXAMPLE 5

Example 3 was repeated but with 1.75 g. (7%) of TBTDS. After 7 days 22 1/2 lbs. force was needed at 100% elongation and 29 lbs. at 200% elongation at which cohesive failure occurred. Instantaneous recovery of 75% from 100% elongation was observed. After a further 7 days at 50° C, a force of 50.5 lbs. was needed at 100% elongation and 62.5 lbs. at 150% elongation, at which cohesive failure occurred.

EXAMPLE 6

Example 1 was repeated but with the polymer from Ex. B. At 100% elongation, 7 1/4 lbs. force was required. The instantaneous recovery was 54% which reached 75% after 15 mins.

EXAMPLE 7

500 g. of polymer of Ex. B were obtained in toluene solution, and this was added to the filler combination D, also in toluene. To the mixture was added 5 g. (1%) of TMTDS, and the mixture was stripped free of toluene at 100° C under high vacuum (1 mm). The material was transferred to a Semco mixer/packager and 5 g. of methyltrimethoxysilane (MTMS) were added, and a 5 min. mixing cycle commenced. 10 g. of DIPTDAA were added and a further mixing cycle of 10 mins. used. The material was packed into Schieferdecker cartridges and also test blocks were made up.

A 10 lbs. force was needed at 100% elongation but cohesive failure occurred rapidly.

EXAMPLE 8

Example 7 was repeated but with 10 g. (2%) TMTDS. 11 1/4 lbs. force was required at 75% elongation followed by cohesive failure. Gunnability was 11 g/min. initially, after 7 days at 40° C 12 g/min.

EXAMPLE 9

Example 7 was repeated but 10 g. (2%) of TMTDS were added after removal of toluene, immediately before addition of (MTMS). A 10 1/2 lbs. force was needed at 75% elongation, followed by cohesive failure. Gunnability was 18 g/min. initially and after 7 days at 40° C 19½g/min.

Polymer Preparation Example C

Table 1

| Example | % residual SH in Polysulphide | % reacted SH | Disulphide | % by weight | Inhibitor | % by weight | Gunnability Initial | 7 days 40° C | 20 days 40° C | 50 days 40° C | 90 days RT | Extendibility Force at 100% lb | Recovery % |
|---|---|---|---|---|---|---|---|---|---|---|---|---|---|
| 11 | 1.28 | 22.6 | MeTh | 1 | TEOA | 1 | 11 | 11 | | | 4.1 | 10¾ | 75 |
| 12 | " | " | MeTh | 2 | MTMS | 1 | 7 | 9 | | | 4 | 11½/90 | F |
| 13 | " | " | MeTh | 1½ | MTMS | 1 | 25 | 13.5 | | | 6.2 | .17 | 80 |
| 14 | " | " | BuTh | 2 | MTMS | 1 | 30 | 15.5 | | | 12 | 22/75 | F |
| 15 * | " | " | MeTh | 2 | MTMS | 1 | 15 | 5.5 | | | 3.7 | 17 | 85 |
| 16 | " | " | EtX | 1 | TEOA | ½ | 15 | 10 | | | 4.6 | 8 | 90 |
| 17 | " | " | EtX | 2 | MTMS | 1 | 12.5 | 6.5 | | | 4.1 | 20/90 | F |
| 18 | " | " | EtX | 1½ | MTMS | 1 | 22.5 | 17.3 | | | 13.5 | 18 | Failed after 1m. |
| 19 | " | " | EtX | 1 | TEOA | 1 | 27.6 | 21.2 | | | 12.4 | 10 | 83 |
| 20 | 1.32 | 20.2 | EtX | 1 | MTMS | 1 | 23.5 | 13.1 | | | 7.8 | 16¼/75 | F |
| 21 | " | " | EtX | ½ | TEOA | 1 | 30 | 13.3 | | | 13.0 | 11¾ | 83 |
| 22 | " | " | EtX | 1½ | TEOA | 1 | 15.8 | 3.6 | | | 3.4 | 16¾ | Failed after 3m. |
| 23 | 1.28 | 22.6 | EtX | 1½ | TEOA | 1 | 21 | 11 | 8.9 | 6.4 | | 9¼ | 95 |
| 24 | " | " | EtX | 2 | TEOA | 1 | 15.4 | 9.8 | | | | | |
| 25 | " | " | MeAnTh | 2 | TEOA | 1 | 21 | 12.6 | 6.6 | 3.6 | | 5¼ ** | 90 |
| 26 | " | " | MeAnTh | 3 | TEOA | 1 | 10.6 | 7 | 1.9 | | | 7¼ | 95 |
| 27 | 1.26 | 23.9 | DBTDS | 2 | TEOA | 1 | 25.9 | 15.5 | 12.0 | | | 22½/75 | F |
| 28 | 1.26 | " | DBTDS | 1½ | TEOA | 1 | 10.5 | 7.3 | 8.4 | | | 22/80 | F |
| 29 | 1.26 | " | DBTDS | 0.75 | TEOP | 1.2 | 63.8 | 62 | 50 | | | 17 | 85 |
| 30 | 1.28 | 22.6 | DThM | 1 | TEOA | 1 | 20.7 | 13.4 | | | | 4½ | 80 |
| 31 | 1.28 | 22.6 | DThM | 1½ | TEOA | 1 | 22.9 | 7 | | | | 7¼ | 90 |
| 32 | 1.28 | 22.6 | DThM | 1 | MTMS | 1 | 12.0 | 11.5 | | | | 8½ | failed after 1 minute |

Key:
MeTh = tetramethylthiuramdisulphide
BuTh = tetrabutylthiuramdisulphide
MeAnTh = methylaniline thiuramdisulphide
EtX = diethyl xanthogen disulphide
DBTDS = dibenzothiazoledisulphide
DThM = dithiobismorpholine
TEOA = triethyl orthoacetate
TEOP = triethyl orthopropionate
MTMS = methyltrimethoxysilane
F = failed    ** Fail at 175% extension
* The polysulphide reacted with the disulphide was a mixture of two parts of the silanized polysulphide and one part of the unsilanized polysulphide.

Polysulphide polymer used in Example A (5 kg) was dissolved in toluene, (5 kg) and the solution was azeotropically distilled for three hours to remove water (2 g). Sulphur (25g) and methlvinyldimethoxysilane (150g) were added and the mixture refluxed for 18 hours under an atmosphere of nitrogen. The product was stripped under 14 mm vacuum for three hours at 100° C, and the resultant polymer had an SH content of 1.24% corresponding to 75% of the original SH groups still free.

EXAMPLE 10

To a toluene solution (1 Kg) of polymer produced in Example C, diethylxanthogen disulphide (7.5g) was added, and the mixture warmed to reflux for two hours in an atmosphere of nitrogen. The polymer solution and filler mixture D were mixed, and toluene stripped off at 100° C and 14mm over 4 – 6 hours, to give a solvent content (volatiles) of <5% by weight. The mixture was allowed to cool, and transferred to a Semco mixer pot. Inhibitor, methyltrimethoxy silane (5g) was added and mixed in for 5 minutes, followed by catalyst, di-isopropyltitaniumdiacetylacetonate (10g) which was mixed for ten minutes.

Samples were then packed in airtight containers and stored. These were tested for gunnability after storage under conditions as described above. In addition, test pieces 50×12×12 mm were made up, allowed to cure for seven days at 20° C and 50% RH, and tested by elongation at 6mm/min. to 100% of their length, the force required being recorded, samples held at this elongation for 5 minutes and then released, and the recovery after 1 hour recorded.

The gunnability results were as follows: initially 22.5 g/min, after seven days at 40° C, 17.3 g/min and after three months at room temperature 13.5 g/min. The maximum elongation was 100% and needed a force of 18 lb, the sample failing during the five minutes maintenance of this elongation.

EXAMPLES 11 - 32

The process of Example 10 was repeated with different percentages of reaction of polysulphide and reactive silane, different disulphides in different amounts and with different moisture inhibitors in different amounts. The results are shown in Table 1. In the columns in the table headed "extendibility," the figures such as 11½/90 and F mean that the cured sample needed a force of 11½ lbs. at the maximum elongation of 90%, after which the specimen failed.

The absolute values of the gunnability are not comparable between the various examples because they depend substantially on the percentage of residual solvent in the specimen.

EXAMPLES 33 - 46

The process of Example 10 was repeated with different percentages of reaction of polysulphide and the reactive silane, different disulphides in different amounts and with different moisture inhibitors in different amounts. The results are shown in Table 2, in which are given in some cases the results of extending the specimen beyond 100%; the words pass or fail denote whether the specimen could be stretched to the specified extension and that extension maintained for 5 minutes.

toluene was divided equally between the two mixtures of fillers (990 g each) and each of the resulting mixtures

TABLE II

| Ex. | % residual SH in polysulphide | % reacted SH | Disulphide | % by weight | Inhibitor | % by weight | Gunnability Initial | Gunnability 7 days at 40° C | Extendibility Force at 100% lb | Results of extension beyond 100% |
|---|---|---|---|---|---|---|---|---|---|---|
| 33 | 1.26 | 23.9 | EtX | 2 | TEOA | 1 | 20 | 16 | 3 | — |
| 34 | 1.28 | 22.6 | EtX | 1.5 | TEOA | 1 | 12 | 8.5 | 4.75 | (Fail 150% after 17 days cure |
| 35 | 1.28 | 22.6 | EtX | 1.5 | TEOA | 1 | 21 | 11 | 10 | (Fail 175% after 14 days cure |
| 36 | 1.24 | 25.0 | EtX | 2 | TEOA | 1 | 100 | 60.9 | 5.5 | Pass 200% |
| 37 | 1.24 | 25.0 | MeAnTh | 3 | TEOA | 1 | 22 | 8.6 | 7.5 | Fail 200% |
| 38 | ca 1.1 | ca 33 | MeAnTh | 2 | TEOP | 1 | 40 | 31 | -2.5 | — |
| 39 | 1.24 | 25.0 | DBTDS | 2 | TEOA | 1 | 14.1 | 3.28 | 5.5 | Fails 200% |
| 40 | 1.24 | 25.0 | DBTDS | 0.75 | TEOA | 1 | 24 | 18 | 5 | — |
| 41 | 1.24 | 25.0 | MeTh | 1.25 | MTMS | 1 | 160 | 80 (6 mths) | 17.5 | — |
| 42 | 1.27 | 23.3 | BuTh | 4 | MTMS | 1 | 12.8 | 7.8 | 12 | — |
| 43 | 1.27 | 23.3 | BuTh | 4 | TEOA | 1 | 14.7 | 10.5 | 3 | Fail 150% |
| 44 | 1.28 | 22.6 | MeTh | 2 | TEOA | 1 | 4.8 | 2.6 | 4.5 | Force of 17½ lbs at 200% after 21 days cure. |
| 45 | 1.28 | 22.6 | MeTh | 2 | MTMS | 1 | 4.5 | 3.2 | 4 | Pass 200% after 14 days cure |
| 46 | 1.28 | 22.6 | MeTh | 1 | TEOA | 0.5 | 11 | 11 | 10.75 | — |

EXAMPLES 47 and 48

The polymer used in Example A, sold as Thiokol LP12 (8kg) and toluene (8kg) were mixed and stirred. The mixture was azeotropically distilled for 8 hours to remove water (25g), methylvinyldimethoxysilane (240g 3%) and sulphur (40g ½%) were added and the analysis for SH on a sample after evaporation of solvent under vacuum gave a figure of 1.24% corresponding to 75.0% of the original SH groups i.e. 25.0% reaction. Diethylxanthogen disulphide (130g 1.7%) (Example 47) or dibenzothiazoledisulphide (60g 0.75%) (Example 48) was added, and the mixture was refluxed for a further 2 hours. It was allowed to cool slightly and a vacuum applied, to remove the toluene, with final evaporation at 3mm and 80° C. Triethylorthoacetate (20g ¼%) was added and stirred, and the polymer stirred; this polymer had a package life in excess of 9 months. Test blocks of both of these materials after 7 days at 50% RH could be extended by 90% with a force of 6½ - 8 lbs, and just failed at 100% elongation.

EXAMPLE 49 AND COMPARATIVE EXAMPLE 1

A solution of Thiokol LP31, (1 kg) of approximate statistical formula

HS [(CH$_2$CH$_2$OCH$_2$OCH$_2$CH$_2$SS)$_{42}$ (CH$_2$—CHCH$_2$SS)$_{0.21}$(SH)$_{0.21}$] CH$_2$CH$_2$OCH$_2$OCH$_2$CH$_2$SH in toluene (1 kg) was distilled azeotropically for six hours to remove water (0.4 mls) Vinylmethyldimethoxysilane (100 g - by weight) and sulphur (5 g - 0.5% by weight) were added, and the mixture was boiled under reflux for 16 hours. A sample (5 g) was stripped of volatile components and analysed for SH content. It was found that 11% of the SH groups had reacted.

Two mixtures of fillers were prepared, each containing

| Calofort S | 350 g |
|---|---|
| Titanium Dioxide | 80 g |
| Cereclor 56 L | 350 g |
| Toluene | 1 l. | and the mixtures were azeotropically distilled for 4 hours to remove water, (1 ml.). The polymer solution in toluene was stripped under vacuum at up to 100° C and 2 mm pressure to remove toluene. Both mixtures were transferred to pots of a Semco mixer packager. To Mixture A, 5 g (1%) of methyltrimethoxysilane were added, and to Mixture B, 5 g of triethyl orthoacetate were added. The mixer was operated for five minutes in each case; then to each mixture 10 g of diisopropyltitaniumdiacetylacetonate were added, and a ten minute mixing cycle given. Samples were then packaged in tubes for storage checks and gunned into 2 × ½ × ½ inch cavities for extensibility tests, as described above. The following results were obtained:-

|  | Comp. Ex. 1 A. (Si based) | Ex. 49 B. (C based) |
|---|---|---|
| Max. Elongation | 75% | 100% |
| Force | 10¼ lbs. | 9 lbs. |
| Gunnability: initial | 60.4 g/min | 53.7 g/min |
| : 7 days/40° C | 57.0 g/min | 42.0 g/min |
| : 100 days room temperature | 38.0 g/min | 26.4 g/min |

We claim:
1. A sealant composition which can be extruded and can be cured with moisture to give an elastomer, said composition comprising a fluid SH containing reaction product of (a) a silanized polysulphide which is the product of reacting under anhydrous conditions a polysulphide of formula

HS [(CH$_2$(R')$_b$CH$_2$S$_a$)$_c$(R"S$_a$)$_d$(SH)$_f$] CH$_2$(R')$_b$CH$_2$SH where $a$ is 1 - 5, $b$ is 0 or 1, $c$ is 5 - 50, $d$ is 0 - 0.05$c$ and 0.05$c$ ≧ $f$ ≧ $d$, 1 > $f$ which is $d$ times (No. of free valencies in R" - 2), R' is O, S or a divalent saturated organic radical consisting of carbon and hydrogen atoms and optionally O and/or S in COC, CS$_a$C or OH links, R" is an at least trivalent saturated radical consisting of carbon and hydrogen atoms and optionally O and/or S in COC, CS$_a$C or OH links, with a silane of formula Q$_n$ SiX$_{4-n}$ where $n$ is 1 or 2, Q is a group capable of reacting under the reaction conditions with the SH groups of the polysulphide and at least two groups X are hydrolysable groups and the remaining group X (if any) is alkyl or chloroalkyl, the silane having 1 or 2 groups capable of reaction with SH, and the silane reacting with 3 - 30% of the SH groups of the polysulphide, and (b) a disulphide of formula

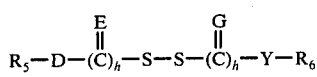

where both h are 0 or both h are 1, and each of D and Y, which are the same or different, represents an — $NR_7$ group, each of E and G, which are the same or different, represents an oxygen or sulphur atom or an $NR_8$ group and each of $R_5$, $R_6$, $R_7$ and $R_8$ which are the same or different, represents a univalent aliphatic, cycloaliphatic or heterocyclic group, an aryl group of 6 - 13 carbon atoms, or an aralkyl group of 7 - 19 carbon atoms, a cycloaliphatic aliphatic group or a heterocyclic aliphatic group, or at least one pair of $R_5$ and $R_7$, $R_6$ and $R_8$, $R_5$ and $R_8$ or $R_6$ and $R_8$ together represent a divalent aliphatic group of 2 to 8 carbon atoms, an arylene group, a cycloalkylene group, arylalkylene group, cycloalkylalkylene group or a divalent aliphatic group of 2 to 8 carbon atoms, which is interrupted by an oxygen or sulphur atom in an ether or thioether linkage respectively, or by an imino group of formula $NR_9$ where $R_9$ is hydrogen or an alkyl, aralkyl or aryl group, or, when both h are 1, each of D and Y, which are the same or different, may be an oxygen or sulphur atom, the product of multiplying the molar fraction of disulphide to polysulphide by the molecular weight of the polysulphide is 200 - 3500, and the reaction of said silanized polysulphide and said disulphide having been carried out at a temperature and for a time until the disulphide disappears.

2. A composition according to claim 1 wherein the reaction product has a molecular weight of 8000 - 13000.

3. A composition according to claim 1 wherein the product of multiplying the molar fraction of disulphide to polysulphide by the molecular weight of the polysulphide is 200 - 2000.

4. A composition according to claim 1 wherein the ratio of the molecular weight of the polysulphide, which is reacted to form silanized polysulphide (a), to the percentage of reaction of silane with the polysulphide is 140 - 300 : 1.

5. A composition according to claim 1 wherein the disulphide is of formula

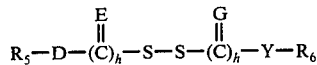

wherein both h are 1 and each of D, E, G and Y, which are the same or different, represents an oxygen or sulphur atom, or an $NR_7$ group, and each of $R_5$, $R_6$ and $R_7$, which are the same or different, represents a monovalent alkyl group, a cycloalkyl group, an aryl group of 6 - 13 carbon atoms or an aralkyl group of 7 - 19 carbon atoms, or at least one pair of $R_5$ and $R_7$, or $R_6$ and $R_7$ represents an alkylene or alkenylene group of 2 to 8 carbon atoms, an arylene group, a cycloalkylene group, arylalkylene group or a cycloalkylenealkylene group.

6. A composition according to claim 1 wherein the product of multiplying the molar fraction of disulphide to polysulphide by the molecular weight of the polysulphide is 400 - 2000.

7. A composition according to claim 6 wherein in the disulphide both h are 1, E and G are sulphur atoms and D and Y are either both sulphur atoms or both oxygen atoms and the product of multiplying the molar fraction of disulphide to polysulphide by the molecular weight of the polysulphide is 1000 - 2000.

8. A composition according to claim 7 wherein D and Y are both oxygen atoms and $R_5$ and $R_6$ are both alkyl groups of 1 to 8 carbon atoms.

9. A composition according to claim 8 wherein the disulphide is ethyl xanthogen disulphide.

10. A composition according to claim 8 wherein the molecular weight of the polysulphide is about 4000.

11. A composition according to claim 6 wherein in the disulphide both h are 1, E and G are sulphur atoms, D is an $NR_7$ group, Y is an $NR_8$ group, each of $R_5$, $R_6$ and $R_7$ and $R_8$, which are the same or different, represents an alkyl group of 1 to 8 carbon atoms, a cycloalkyl group of 5 or 6 carbon atoms, or an aryl group or $R_5$ and $R_7$ or $R_6$ and $R_8$ together form an alkylene group of 3 to 7 carbon atoms.

12. A composition according to claim 11 wherein $R_5$, $R_6$, $R_7$ and $R_8$ represent the same alkyl group of 1 to 4 carbon atoms and the product of multiplying the molar fraction of disulphide to polysulphide by the molecular weight of the polysulphide is 400 - 1200.

13. A composition according to claim 12 wherein the disulphide is tetramethyl thiuram disulphide or tetrabutylthiuram disulphide.

14. A composition according to claim 11 wherein each of $R_5$ and $R_6$ represents an aryl group and the product of multiplying the molar fraction of disulphide to polysulphide by the molecular weight of polysulphide is 800 - 1400.

15. A composition according to claim 14 wherein $R_5$ represents an aromatic hydrocarbon group of 6 to 8 carbon atoms and $R_7$ represents an alkyl group of 1 to 8 carbon atoms.

16. A composition according to claim 15 wherein the molecular weight of the polysulphide is about 4000.

17. A composition according to claim 16 wherein the disulphide is di (N, phenyl N methyl) thiuram disulphide or di (N phenyl N ethyl) thiuram disulphide.

18. A composition according to claim 5 wherein the disulphide is of formula

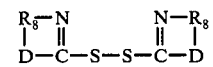

where D is an oxygen or sulphur atom or $NR_9$ group, $R_8$ is as defined in claim 5 for a pair of $R_5$ and $R_7$, or $R_6$ and $R_7$, and $R_9$ is hydrogen or an alkyl group of 1 to 8 carbon atoms.

19. A composition according to claim 18 wherein the product of multiplying the molar fraction of disulphide to polysulphide by the molecular weight of the polysulphide is 200 - 700.

20. A composition according to claim 19 wherein each $R_8$ is an o-phenylene group.

21. A composition according to claim 20 wherein the disulphide is di(benzthiazole) disulphide.

22. A composition according to claim 6 wherein the disulphide is of formula

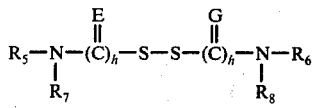

33. A composition according to claim 32 which comprises the reaction product of (a) the product of reaction of a polysulphide of formula

wherein each $h$ is 0, each of $R_5$, $R_6$, $R_7$ and $R_8$ which are the same or different, represents an aliphatic, cycloaliphatic, heterocyclic or aralkyl group or a cycloaliphatic - aliphatic or heterocyclicaliphatic group, or at least one pair of $R_5$ and $R_7$, or $R_6$ and $R_8$ combined represents a divalent aliphatic group which may be interrupted by an oxygen or sulphur atom in an ether or thioether linkage respectively or by an imino group of formula $NR_9$, wherein $R_9$ is hydrogen or an alkyl or aryl group.

23. A composition according to claim 22 wherein the product of multiplying the molar fraction of disulphide to polysulphide by the molecular weight of polysulphide 400 - 1200.

24. A composition according to claim 22 wherein $R_5$ and $R_6$ are alkyl groups or cycloalkyl groups of 5 - 7 carbon atoms and $R_7$ and $R_8$ are alkyl groups or cyanoalkyl groups, or the pairs of $R_5$ and $R_7$, and $R_6$ and $R_8$ each represents a 3-oxapentamethylene group.

25. A composition according to claim 23 wherein the disulphide is N,N'-dithiobismorpholine.

26. A composition according to claim 1 wherein in the polysulphide R'' is a trivalent radical, $b = 1$, and R' is a divalent organic radical free of alphatic unsaturation consisting of C and H atoms and at least one of O and S atoms in the form of C—O—C or C—$S_a$—C links.

27. A composition according to claim 26 wherein R' is a CH$_2$OCH$_2$OCH$_2$ radical and R'' is a —CH$_2$CHCH$_2$— group.

28. A composition according to claim 1 wherein the silane is of formula QSiX$_3$.

29. A composition according to claim 28 wherein Q is a vinyl group.

30. A composition according to claim 28 wherein at least two groups X are alkoxy groups of 1 - 6 carbon atoms and the remaining group X (if any) is an alkyl group of 1 - 6 carbon atoms.

31. A composition according to claim 30 wherein the silane is vinyl triethoxy silane or vinyl methyl dimethoxy silane.

32. A composition according to claim 27 wherein product (a) is obtained by reacting under anhydrous conditions a polysulphide of formula

wherein $a$ is 2 - 3 and $d$ and $f$ are the same and up to 0.05c and $c$ is 5 - 50 with an amount of silane of formula Q SiX$_3$, wherein Q is a vinyl group and two X groups represent methoxy or ethoxy groups and the third X group represents a methyl, methoxy or ethoxy group, sufficient to react with 3 - 30% of the SH groups of the polysulphide, the ratio of the molecular weight of the polysulphide to the % of SH groups reacted with silane being 140 : 1 to 300 : 1.

HS[(CH$_2$CH$_2$OCH$_2$OCH$_2$CH$_2$S$_2$)$_c$(CH$_2$CHCH$_2$S$_2$)$_d$(SH)$_d$]CH$_2$CH$_2$OCH$_2$OCH$_2$CH$_2$SH where $c$ is 23, and $d$ is up to 1, with vinyl methyl dimethoxy silane or vinyl tri ethoxy silane to cover 20-27% of the SH groups, and (b) (i) 0.5 - 1.5% by weight of dibenzthiazole disulphide, (ii) 1 -4% by weight of diethyl xanthogendisulphide

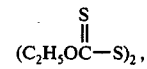

(iii) 0.5 -3% by weight of bis (methylaniline) thiuram disulphide, (iv) 0.8 - 3% by weight of tetramethyl thiuram disulphide, (v) 2 -6% by weight of tetrabutyl thiuram disulphide, or (vi) 0.5 - 2.5% by weight of N,N'-dithio bis morpholine.

34. A composition according to claim 1 which also contains 0.1 - 10% by weight of a silane hydrolysis inhibitor of formula $Z_{n'}Si(OZ')_{4-n'}$, wherein $n'$ is 0, 1 or 2, Z is alkyl or aryl, and Z' is methyl, ethyl or acyl of 1 to 8 carbon atoms.

35. A composition according to claim 33 which also contains 0.1 - 10% by weight of a silane hydrolysis inhibitor of formula $Z_{n'}Si(OZ')_{4-n'}$, wherein $n'$ is 0, 1 or 2, Z is alkyl or aryl, and Z' is methyl, ethyl or acyl of 1 to 8 carbon atoms.

36. A composition according to claim 1 which also contains 0.1 - 10% by weight of an ortho ester of formula $(R_3)_gC(OR_4)_{4-g}$ wherein $g$ is 0 or 1, $R_3$ is hydrogen, alkyl or aryl and $R_4$ is alkyl or aryl.

37. A composition according to claim 33 which also comprises 0.1 - 10% by weight of an ortho ester of formula $(R_3)_gC(OR_4)_{4-g}$ wherein $g$ is 0 or 1, $R_3$ is hydrogen, alkyl or aryl and $R_4$ is alkyl or aryl.

38. A composition according to claim 36 wherein the ortho ester is triethyl orthoacetate.

39. A sealant composition which can be extruded and can be cured with moisture to give an elastomer, said composition comprising (a) a silanized polysulphide which is the product of reacting under anhydrous conditions a polysulphide of formula

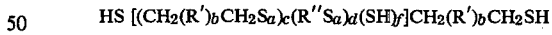

where $a$ is 1 - 5, $b$ is 0 or 1, $c$ is 5 - 100, $d$ is 0 - 0.5c and 0.05c $\geq f \geq d$, $1 > f$ which is $d$ times (No. of free valencies in R''- 2), R' is O, S or a divalent saturated organic radical consisting of carbon and hydrogen atoms and optionally O and/or S in COC, CS$_a$C or OH links, R'' is an at least trivalent saturated radical consisting of carbon and hydrogen atoms and optionally O and/or S in COC, CS$_a$C or OH links, with a silane of formula $Q_nSiX_{4-n}$ where $n$ is 1 or 2, Q is a group capable of reacting under the reaction conditions with the SH groups of the polysulphide and at least two groups X are hydrolysable groups and the remaining group X (if any) is alkyl or chloroalkyl, the silane having 1 or 2 groups capable of reaction with SH, and the silane reacting with 3 - 30% of the SH groups of the polysulphide, and (b) an ortho ester which is present as 0.1 - 10% by weight of the silanized polysulphide (a) and is of formula $(R_3)_g C(OR_4)_{4-g}$, where $g$ is 0 or 1, $R_3$ is hydrogen, alkyl or aryl, and $R_4$ is alkyl or aryl, the composition containing unreacted SH groups and being in the absence of amounts of compounds capable of curing the polysulphide to an elastomer in the absence of moisture.

40. A composition according to claim 39 wherein the ortho ester is triethyl orthoacetate.

41. A composition according to claim 1, which also comprises a filler, plasticizer and moisture curing catalyt.

42. A composition according to claim 33 which also comprises a filler, plasticizer and moisture curing catalyst.

43. A composition according to claim 41 wherein the catalyst is a titanate ester.

44. A cured sealant obtained by exposing to moisture a composition as claimed in claim 1.

45. A cured sealant obtained by exposing the moisture a composition as claimed in claim 39.

* * * * *